United States Patent
Chang et al.

(10) Patent No.: US 7,221,985 B2
(45) Date of Patent: May 22, 2007

(54) ON-SCREEN CALIBRATION SYSTEM AND OPERATING METHOD THEREOF

(75) Inventors: Rei-Chang Chang, Taipei (TW); San-Chi Chien, Taipei (TW); Lih-Hwa Kuo, Taipei (TW); Sung-San Chang, Taipei (TW)

(73) Assignee: Lite-On IT Corporation, Taipei (TW)

( * ) Notice: Subject to any disclaimer, the term of this patent is extended or adjusted under 35 U.S.C. 154(b) by 764 days.

(21) Appl. No.: 10/655,256

(22) Filed: Sep. 4, 2003

(65) Prior Publication Data

US 2004/0122533 A1    Jun. 24, 2004

(30) Foreign Application Priority Data

Dec. 24, 2002    (TW) .............................. 91137105 A

(51) Int. Cl.
*G05B 19/18* (2006.01)
*G11B 27/36* (2006.01)
*G11B 19/02* (2006.01)
*G11B 11/00* (2006.01)

(52) U.S. Cl. ............................ 700/56; 700/57; 700/58; 700/59; 700/64; 360/31; 360/69; 360/70; 360/72.1; 369/13.12; 369/13.2; 369/53.19; 369/44.17; 720/606; 720/619; 720/645; 720/695

(58) Field of Classification Search ................. 700/56, 700/57, 58, 59, 61–64; 360/31, 69–70, 72.1, 360/75, 79–80; 369/44.32, 13.12, 13.2, 44.17–44.18, 369/53.18, 53.19; 720/606, 619, 622, 645, 720/681, 695
See application file for complete search history.

(56) References Cited

U.S. PATENT DOCUMENTS

| | | | |
|---|---|---|---|
| 4,992,893 A * | 2/1991 | Kanai et al. ............. | 360/78.13 |
| 5,859,358 A * | 1/1999 | Wood et al. ..................... | 73/9 |
| 5,896,362 A * | 4/1999 | Okuda et al. ............ | 369/53.19 |
| 5,902,115 A * | 5/1999 | Katayama ............... | 434/307 A |
| 6,130,744 A * | 10/2000 | Abe et al. ..................... | 356/73 |
| 6,678,222 B1* | 1/2004 | Schroder et al. ......... | 369/44.32 |
| 6,728,185 B2* | 4/2004 | Terashi et al. .......... | 369/53.28 |
| 6,862,257 B2* | 3/2005 | Lin et al. ................. | 369/53.28 |
| 6,925,039 B2* | 8/2005 | Yanagawa et al. ....... | 369/44.32 |
| 6,956,802 B2* | 10/2005 | Kato et al. ............... | 369/53.22 |
| 7,005,849 B2* | 2/2006 | Tse et al. .................... | 324/212 |
| 7,133,341 B2* | 11/2006 | Liu et al. ................. | 369/53.19 |
| 2002/0176342 A1* | 11/2002 | Worthington et al. .... | 369/53.31 |

* cited by examiner

*Primary Examiner*—Ramesh Patel
(74) *Attorney, Agent, or Firm*—Thomas, Kayden, Horstemeyer & Risley

(57) ABSTRACT

An on-screen calibration system for disc drives and the operating method thereof. The calibration system includes an autocollimator detecting the inclined angle of the stage of a disc drive. A control module is connected to the on-screen display module and a bar code scanner to receive the bar code of the pick-up module and compute a predetermined position data. A monitor displays a moving point according to the inclined angle and a target point according to the predetermined position data through an on-screen display module. The tilt-adjusting mechanism supporting the pick-up module is adjusted to shift the moving point overlapping the target point.

13 Claims, 3 Drawing Sheets

ON-SCREEN CALIBRATION SYSTEM AND OPERATING METHOD THEREOF

BACKGROUND OF THE INVENTION

1. Field of the Invention

The present invention relates to a calibration system for disc drives, and in particular to a calibration system using an on-screen display module to calibrate the inclined angle of the pick-up module in disc drives.

2. Description of the Related Art

Pick-up modules are one of the key components in conventional disc drives, such as DVD-ROMs or CD-ROMs. However, when assembling a disc drive, the optical axis of the pick-up module must be parallel, or have a predetermined included angle, relative to the normal angle of an inserted disc, ensuring that the pick-up module can function properly. Thus, conventional disc drives usually have tilt-adjusting mechanisms to calibrate the optical axis of pick-up modules.

FIG. 1 is a perspective view of a conventional disc drive. In FIG. 1, the disc drive has a pick-up module 11 driven by a sliding mechanism 12, a stage 13 driven by a spindle motor and a control PCB 14. The sliding mechanism 12 includes two lead screws 15 arranged in parallel, forming a surface on which the pick-up module 11 moves. The height of one end of a major lead screw can be adjusted, and the other end is fixed. Furthermore, the height of both ends of the other lead screw can be adjusted, such that the sliding surface of the pick-up module 11 can be modified. When a disc is loaded, it is possible that the disc and the sliding surface are not parallel because of the inaccuracy of the spindle motor, or the improper assembly of the lead screws 15. It can cause jitters of 10 μm~1 mm during disc rotation. Thus, the data received by the pick-up module 11 may have errors.

A conventional calibration method includes two steps. First, the inclined angle and vibration of the disc supported by the stage is adjusted through an autocollimator. Next, the jitter value of RF signals emitted by the pick-up module is tuned through a jitter meter. The jitter value must be lower than a predetermined value to ensure the accuracy of output data. Unqualified disc drives with a jitter value higher than the predetermined value will again be adjusted.

Jitter meters used in the conventional calibration method are easily jammed by external noise. They cannot directly determine the optimum jitter value of each pick-up module, and each pick-up module must be checked several times to ensure product quality.

Moreover, because the reading light paths for CDs and DVDs are different, the jitter values with respect to CDs or DVDs of the same pick-up module are different. Thus, the conventional calibration method individually calibrates the jitter value of CDs and DVDs, thus complicating fabrication. Additionally, the inclined angle of the sliding surface and the jitter value cannot be simultaneously calibrated. Hence, there is a need for a better calibration system, which addresses this problem, and simplifies the conventional calibration method.

SUMMARY OF THE INVENTION

Accordingly, an object of the invention is to provide an on-screen calibration system and operating method for disc drives. The inclined angle and the jitter value of pick-up modules can be adjusted simultaneously, thus shortening the calibration time of each disc drive.

The present invention provides an on-screen calibration system for disc drives. The calibration system includes an autocollimator detecting the inclined angle of the stage of a disc drive. A control module is connected to the on-screen display module and a bar code scanner, receiving the bar code of a pick-up module and computing a predetermined position data. A monitor displays a moving point according to the inclined angle and a target point according to a predetermined data position through an on-screen display module. The tilt-adjusting mechanism supporting the pick-up module is adjusted to shift the moving point overlapping the target point, thus minimizing the jitter value of the pick-up module.

Moreover, a switch is respectively connected to the autocollimator, control module and on-screen display module. The switch can be a TV box. The on-screen display module is operated in wired or logic mode. The control module and the on-screen display module are connected by a print port or a communication port through the IIC protocol. The monitor is a CRT display or an LCD.

The present invention also provides an operating method for the calibration system to calibrate the inclined angles of stages in disc drives. The method includes the autocollimator detecting the inclined angle of the stage of the disc drive. Next, a monitor displays a moving point through an on-screen display module. A bar code scanner scans the bar code of the pick-up module. A control module, such as a microprocessor, computes predetermined position data according to the scanned bar code. The monitor then displays a target point according to the predetermined position data through the on-screen display module. Finally, the tilt-adjusting mechanism supporting the pick-up module is adjusted to shift the position of the moving point overlapping the target point.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
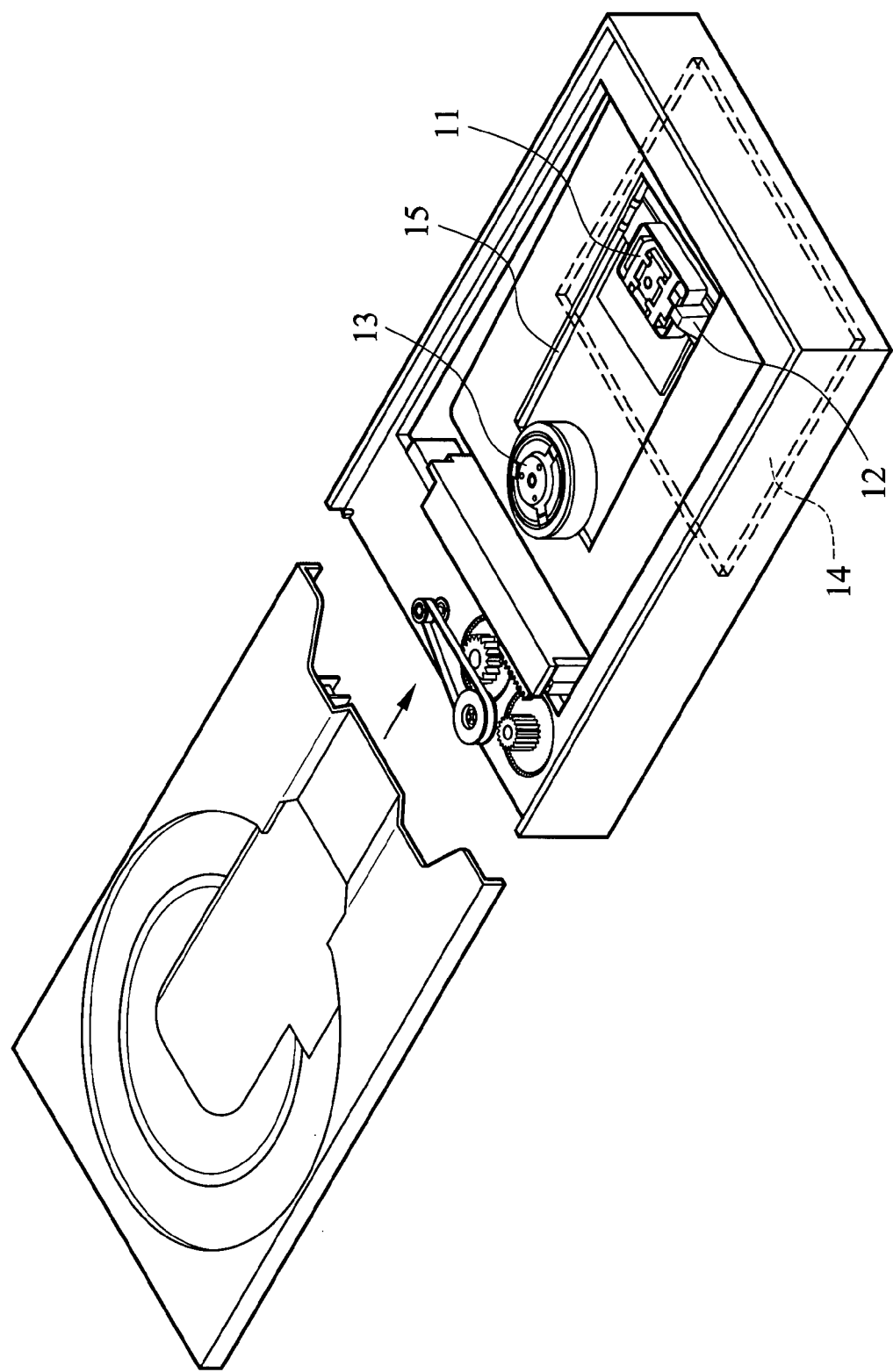
FIG. 1 is a perspective view of a conventional disc drive as referenced in the Prior Art.
Figure 2:
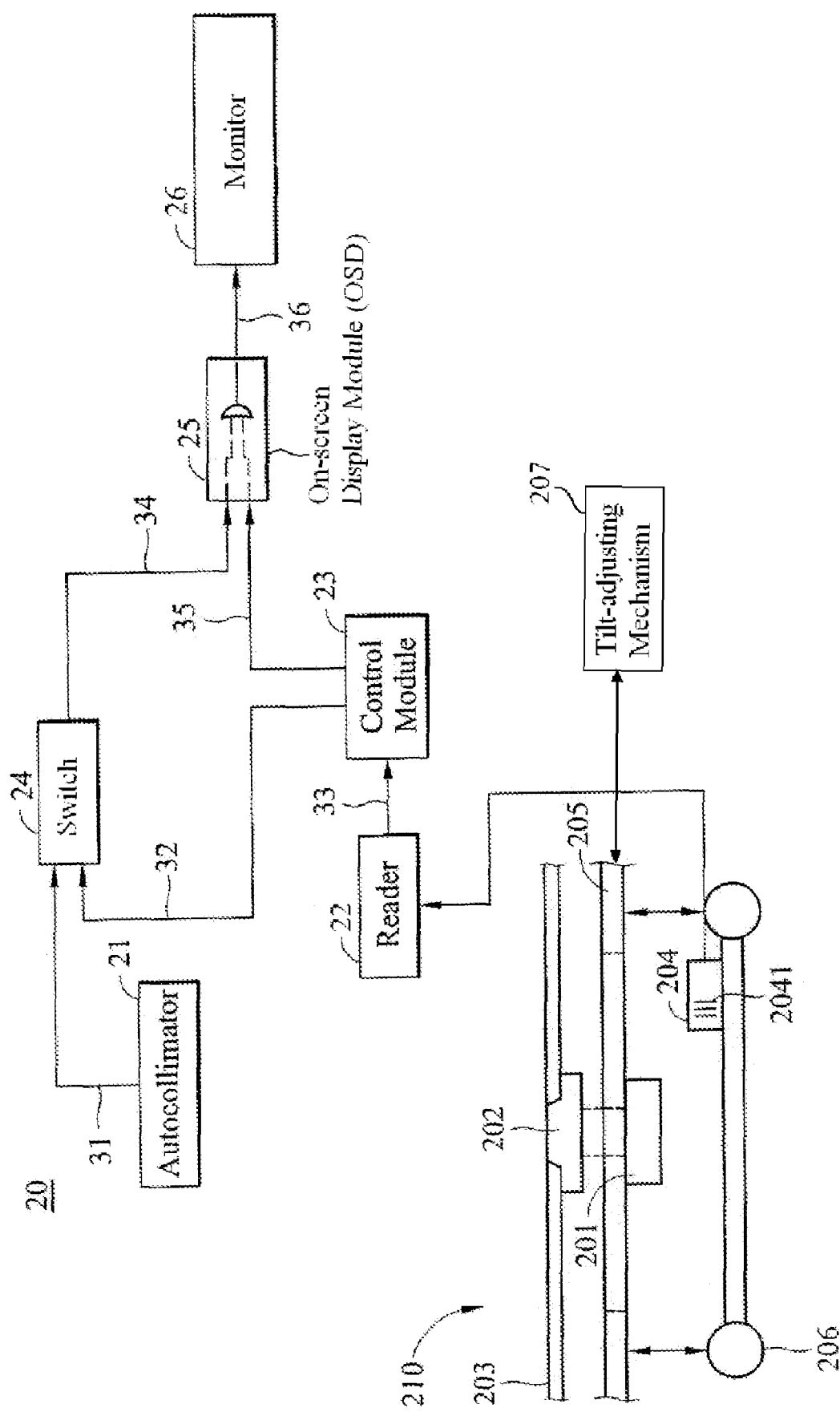
FIG. 2 is a block diagram of the on-screen calibration system of the invention.

FIG. 2 is a block diagram of the on-screen calibration system of the invention. In FIG. 2, the calibration system 20 of the present invention includes an autocollimator 21, bar code scanner 22, control module 33, switch 24, on-screen display module (OSD) 25 and monitor 26. A schematic of the disc drive 210 is shown in FIG. 2. The disc drive 210 includes a plate 205 with a spindle motor 201 and a pick-up module 204 disposed thereon. A stage 202 is connected to the spindle motor 201 to hold discs. The pick-up module 204 is assembled on the plate 205 through a sliding mechanism and tilt-adjusting mechanism 207. The sliding mechanism has two lead screws 206 to shift the pick-up module 204. The tilt-adjusting mechanism 207 modifies the inclined angle of the pick-up module 204.

In FIG. 2, the autocollimator 21 of the invention is aligned with the stage 202 and connected to the switch 24 through a connector 31. After a mirror 203 is disposed on the stage 202, the autocollimator 21 detects a inclined angle of the stage 202 according to the emitted light reflected by the stage. Moreover, the bar code scanner 22 scans a bar code 2041 on the pick-up module 204. The bar code 2041 contains the inclined angle with the optimum jitter value of the pick-up module 204. The control module 23 receives the bar code from the bar code scanner 22 to compute the desired inclined angle. The control module 23 is connected to the switch 24 and the on-screen display module 25 by connectors 32, 35. The switch 24 is a TV box connected to the on-screen display module 25 by a connector 34. The on-screen display module 25 is operated in wired or logic mode and connected to the monitor 26 by an additional connector 36. Furthermore, the monitor 26 is a CRT or LCD monitor. It is compatible with IIC protocol to show specific points according to the position data from the autocollimator 21 and the control module 23.

The pick-up module 204 has a bar code provided by suppliers. The bar code contains the inclined angle of the optimum jitter value data with respect to DVDs or CDs of the pick-up module. The control module 23 computes a position data of a target point according to the preferred inclined angle. The on-screen display module 25 enables the monitor 26 to show a target point according to the position data by a print port or a com port through IIC protocol. At the same time, the autocollimator 21 senses the inclined angle of the stage 202 through a reflected light beam. The autocollimator 21 delivers position data according to the received light beam to the on-screen display module 25, the on-screen display module 25 also enables the monitor 26 to show a moving point according to the position data from the autocollimator 21. Thus, the jitter value of the pick-up module 204 is qualified when the tilt-adjusting mechanism 207 is adjusted to shift the moving point overlapping the target point.

Figure 3:
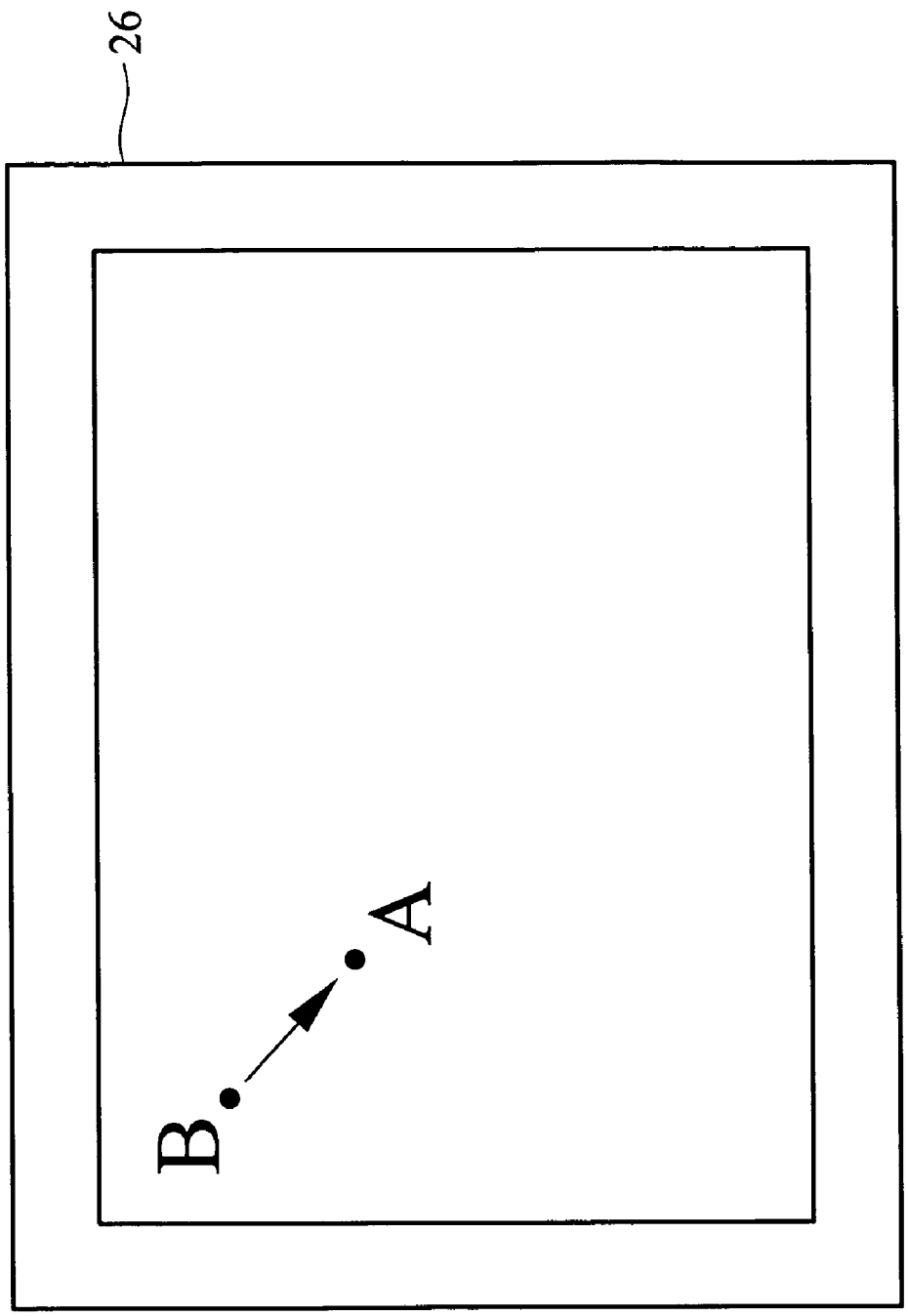
FIG. 3 is a schematic view of the monitor showing the moving point and the target point.

FIG. 3 is a schematic view of the monitor showing the moving point (B) and the target point (A). In FIG. 3, the position data of the target point (A) is calculated by the control module 23, or a computer, according to the inclined angle with the optimum jitter value of the pick-up module. The position data of the moving point (B) is immediately determined by the light beam reflected from the mirror 203. Because the on-screen display module 25 is operated in wired or logic mode, the first and target point are both shown on the monitor 26. Thus, one can simply adjust the tilt-adjusting mechanism 207 to shift the position of the moving point (B), overlapping the target point (A) according the relative positions shown on the monitor 26. The pick-up module 204 is calibrated, and the calibration method of the present invention is complete.

Furthermore, the on-screen display module 25 must be calibrated before the above calibration method proceeds. As the control module 23 is individually connected to the switch 24 and the on-screen display module 25, the monitor 26 shows two points both from the control module 23 when the switch 24 is turned to a second terminal connected to the control module 23. These points are tuned, overlapping each other by the control module 23 through OSD commands. Thus, the calibration method of the invention can is more accurate.

Accordingly, as the on-screen calibration method of the invention combines two conventional steps, the target point (A) according to the preferred inclined angle and the moving point (B) according to the actual inclined angle of the stage 202 are shown on the monitor 26 at the same time. The pick-up module 204 is easily calibrated through the monitor 26. Furthermore, a desired inclined angle of the calibration method can be computed according to the preferred inclined angle marked on the pick-up module and the light paths of CDs and DVDs. Thus, the jitter value of the pick-up module calibrated by the method above is better than that calibrated by the conventional method.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An on-screen calibration system for a disc drive having a stage driven by a spindle motor, comprising:
   a mirror disposed on the stage;
   a monitor;
   an on-screen display module connected to the monitor;
   an autocollimator, connected to the on-screen display module and disposed over the mirror for detecting an inclined angle of the stage, wherein the monitor displays a moving point according to the inclined angle through the on-screen display module;
   a control module, connected to the on-screen display module and having a predetermined inclined angle recorded therein, wherein the control module computes a position data of a target point according to the predetermined inclined angle; and
   a tilt-adjusting mechanism for adjusting the inclined angle of the stage,
   wherein the moving point and the target point are displayed on the monitor at the same time, and the tilt-adjusting mechanism adjusts the inclined angle of the stage until the moving point and the target point overlap.

2. The on-screen calibration system as claimed in claim 1, wherein the on-screen display module is operated in wired or logic mode.

3. The on-screen calibration system as claimed in claim 1, wherein the monitor is a cathode ray tube display.

4. The on-screen calibration system as claimed in claim 1, wherein the monitor is a liquid crystal display.

5. The on-screen calibration system as claimed on claim 1, further comprising:
   a switch, respectively connected to the autocollimator, control module and on-screen display module, wherein the switch is a TV box.

6. The on-screen calibration system as claimed in claim 5, wherein the control module and the on-screen display module are connected through a print port or a com port by IIC protocol.

7. An on-screen calibration system for a disc drive having a stage driven by a spindle motor and a pick-up module marked with a bar code, comprising:
   a mirror disposed on the stage;
   a monitor;
   an on-screen display module connected to the monitor;
   an autocollimator, connected to the on-screen display module and disposed over the mirror for detecting an inclined angle of the stage, wherein the monitor displays a moving point according to the inclined angle through the on-screen display module;

a reader, used for reading the bar code on the pick-up;

a control module connected to the on-screen display module and the reader for receiving the bar code read by the reader and computing a predetermined position data of a target point according to the bar; and a tilt-adjusting mechanism for adjusting the inclined angle of the stage, wherein the moving point and the target point are displayed on the monitor at the same time, and the tilt-adjusting mechanism adjusts the inclined angle of the stage until the moving point and the target point overlap.

8. The on-screen calibration system as claimed in claim 7, wherein the reader is a bar code scanner.

9. The on-screen calibration system as claimed in claim 7, wherein the on-screen display module is operated in wired or logic mode.

10. The on-screen calibration system as claimed in claim 7, wherein the monitor is a cathode ray tube display.

11. The on-screen calibration system as claimed in claim 7, wherein the monitor is a liquid crystal display.

12. A disc drive adjusting method for operating the calibration system as claimed in claim 7, comprising the steps of:

detecting the inclined angle of the stage;

display the moving point according to the inclined angle through the on-screen display module;

computing predetermined position data of a target point by the control module;

displaying the target point through the on-screen display module; and adjusting the tilt-adjusting mechanism to shift the position of the moving point overlapping the target point.

13. The disc drive adjusting method as claimed in claim 12, further comprising the steps of:

scanning the bar code by the reader; and sending the bar code to the control module to compute the predetermined position data.

* * * * *